F. C. FRARY AND S. TEMPLE.
DRYING GAS.
APPLICATION FILED MAR. 15, 1919.
1,359,047. Patented Nov. 16, 1920.
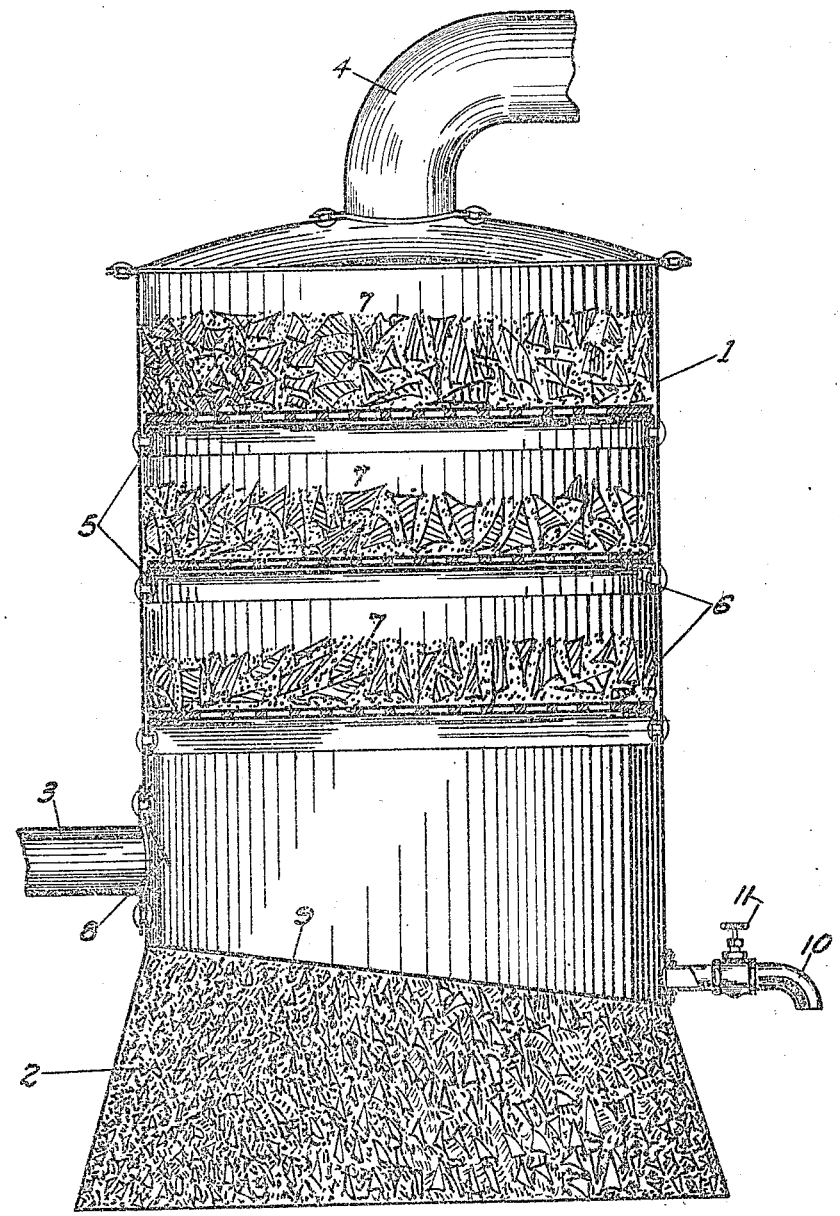

UNITED STATES PATENT OFFICE.

FRANCIS C. FRARY, OF PITTSBURGH, PENNSYLVANIA, AND STERLING TEMPLE, OF PERTH AMBOY, NEW JERSEY.

DRYING GAS.

1,359,047.   Specification of Letters Patent.   Patented Nov. 16, 1920.

Application filed March 15, 1919. Serial No. 282,878.

*To all whom it may concern:*

Be it known that we, FRANCIS C. FRARY and STERLING TEMPLE, citizens of the United States, and residing at Pittsburgh, Pennsylvania, and Perth Amboy, New Jersey, respectively, have invented new and useful Improvements in Drying Gases, of which the following is a specification.

This invention relates to drying gases and has for its object a novel method which is cheap, reliable, continuous and easily performed. Our invention is based on the fact that certain substances are acted upon by certain gases to form compounds capable of absorbing water carried along by such gases, thus drying the same. Such a process is especially adapted to the drying of moist halogens such as chlorin.

Hitherto such gases were dried by means of sulfuric acid trickling down over acid-proof stoneware in a tower of lead or other acid-proof material in a direction opposite to the incoming gases. Since the gases being dried are soluble in the acid and, when chlorin is the gas being dried, the solution thus formed is corrosive, the concentration of the acid is so troublesome that it is usually not attempted but the acid is run to waste.

We have found that a metallic surface such as iron when exposed to a halogen such as chlorin, is attacked at ordinary temperatures, a salt of the metal being formed which dissolves in the moisture carried by the gas. If the gas, for example chlorin, is dry the surface of the iron becomes coated with a layer of anhydrous ferric chlorid. This substance has practically as good drying powers as phosphorous pentoxid and it absorbs moisture from any gas with great rapidity. The same is true to a somewhat less extent of ferric bromid, zinc chlorid or bromid, aluminum chlorid or bromid, and calcium chlorid.

The accompanying drawing illustrates an apparatus capable of being used to carry out our process. The closed cylindrical casing 1 is set upon a base 2 and contains a gas inlet opening 3 near its lower end and a gas outlet 4 at the top. A series of brackets 5 are placed at intervals within the casing, corresponding perforated plates 6 rest upon the brackets and filling material 7 consisting of scraps, filings or turnings of suitable metal such as iron or steel is placed upon the perforated plates. A baffle 8 protects the gas inlet 3 from the solution formed during the drying, and the sloping bottom 9 of the casing allows the same to run off out of the way of the incoming gas. An outlet 10 controlled by valve 11 is placed at the lowest point in the casing through which the solution is removed either intermittently or continuously.

When a chlorin-containing gas is to be dried, the material placed on the perforated plates is usually some form of iron. The gas enters through the inlet 3 and passes upward through the layers of iron, the iron being attacked by the chlorin to form an iron chlorid which rapidly absorbs water from the gas being dried, dissolving in the water so absorbed forming a solution which trickles down to the floor 9 of the casing and is drawn off through pipe 10. Since the solution is removed continuously and practically as fast as formed, leaving always a fresh surface of iron to be acted upon by the entering gas, the process is continuous and extremely efficient.

The desired degree of dehydration is produced by passing the gas through the tower at the rate required by the process for which it is to be used. It is obvious that two or more towers or receptacles may be arranged either in series or in parallel if desired, in order to obtain the desired drying capacity, and they may be of stoneware or earthenware if preferred without departing from the spirit of our invention, which consists specifically in the production of the ferric chlorid or similar substance upon the large surface of the iron or other suitable packing, and the absorption of the moisture by this substance.

Inasmuch as the action herein described is between the element iron and the element chlorin, and such impurities as make the distinction between the different grades of iron and steel have practically no effect except a mechanical one, it is to be understood that where iron is mentioned in the claims or specification, and no qualifying adjective used, it is used in the broad sense to include any of the common forms in which the element iron appears, such as cast iron, wrought iron, different grades of steel, etc. The term "deliquescent" is used to denote a substance which absorbs water but does not necessarily dissolve in the water so absorbed.

Our invention is not limited to the use of iron but other materials such as zinc or aluminum, or in some cases lime, which are capable of reacting with one of the constituents of the gas being dried to form a substance capable of absorbing water may be used.

By our process, we are enabled to dry not only chlorin and the halogens but other gases such as nitrogen, air, etc., when mixed with a halogen. By using lime we can dry hydrochloric acid or gases containing it. We intend to claim broadly the process of drying a gas by passing the same over a metallic surface or over a substance with which it reacts to form a deliquescent substance except as limited by the appended claims.

We claim:

1. A process for drying gases which consists in passing the gas to be dried in contact with a non-deliquescent material which is capable of forming a deliquescent substance with the said gas, at ordinary temperatures.

2. A process of drying gases consisting in passing same in contact with a metallic substance capable of forming a deliquescent substance in the presence of the gas to be dried.

3. A process of drying gases consisting in passing same in contact with a metallic substance capable of forming a deliquescent salt with the gas to be dried.

4. A process of drying chlorin-containing gases which consists in passing same in contact with a metallic iron-containing substance.

5. A process of drying a chlorin-containing gas consisting in passing same in contact with an open-work mass of irregularly shaped iron pieces.

6. A process of drying chlorin gas comprising forming ferric chlorid upon an iron surface by passing the chlorin over said surface, and absorbing moisture from the chlorin by means of the ferric chlorid upon said iron surface.

7. A continuous process of drying gases comprising forming a salt capable of absorbing water from said gases by passing said gases over metal scrap in a tower, allowing the aqueous solution formed by said salt and the moisture from the gases to trickle down to the base of the tower and removing said solution.

FRANCIS C. FRARY.
STERLING TEMPLE.